United States Patent [19]

Kawasaki et al.

[11] Patent Number: 5,161,777
[45] Date of Patent: Nov. 10, 1992

[54] CONTROL DEVICE FOR A VALVE

[75] Inventors: Haruhiko Kawasaki; Kazuhide Maehata; Hisato Naitoh, all of Sagamihara, Japan

[73] Assignee: Kayaba Kogyo Kabushiki Kaisha, Tokyo, Japan

[21] Appl. No.: 776,504

[22] Filed: Oct. 11, 1991

[30] Foreign Application Priority Data

Oct. 15, 1990 [JP] Japan ................................ 2-275626

[51] Int. Cl.$^5$ ............................................. G05D 7/06
[52] U.S. Cl. ................................ 251/129.04; 137/486; 137/487.5
[58] Field of Search ............................ 137/486, 487.5; 251/129.04

[56] References Cited

U.S. PATENT DOCUMENTS 4,796,651 1/1989 Ginn ........................... 137/487.5 X
4,855,659 8/1989 Riensch ..................... 137/487.5 X
4,926,903 5/1990 Kawai ............................ 137/486 X Primary Examiner—Alan Cohan
Attorney, Agent, or Firm—Jordan & Hamburg

[57] ABSTRACT

The safety of control may be secured by decreasing error in the valve position detection to increase the accuracy of flow control and stopping the control function when the valve is in an abnormal condition, so as to prevent any malfunction. The valve position is controlled so that the valve opening rate may correspond with the intended opening rate. When judgement is made to determine that said valve opening rate corresponds with the full-closed position, an output signal produced by the means for detecting the valve displacement when the valve is in the full-closed position is updated and stored as a new signal showing the valve full-closed position, and the intended opening rate of the valve is corrected with reference to the stored value. If the discrepancy between said newly updated and stored signal showing the full-closed position and signal showing the initial valve full-closed position is found to be larger than a predetermined set value, the valve is judged to be in an abnormal state, and then the valve control function is stopped accordingly.

6 Claims, 3 Drawing Sheets

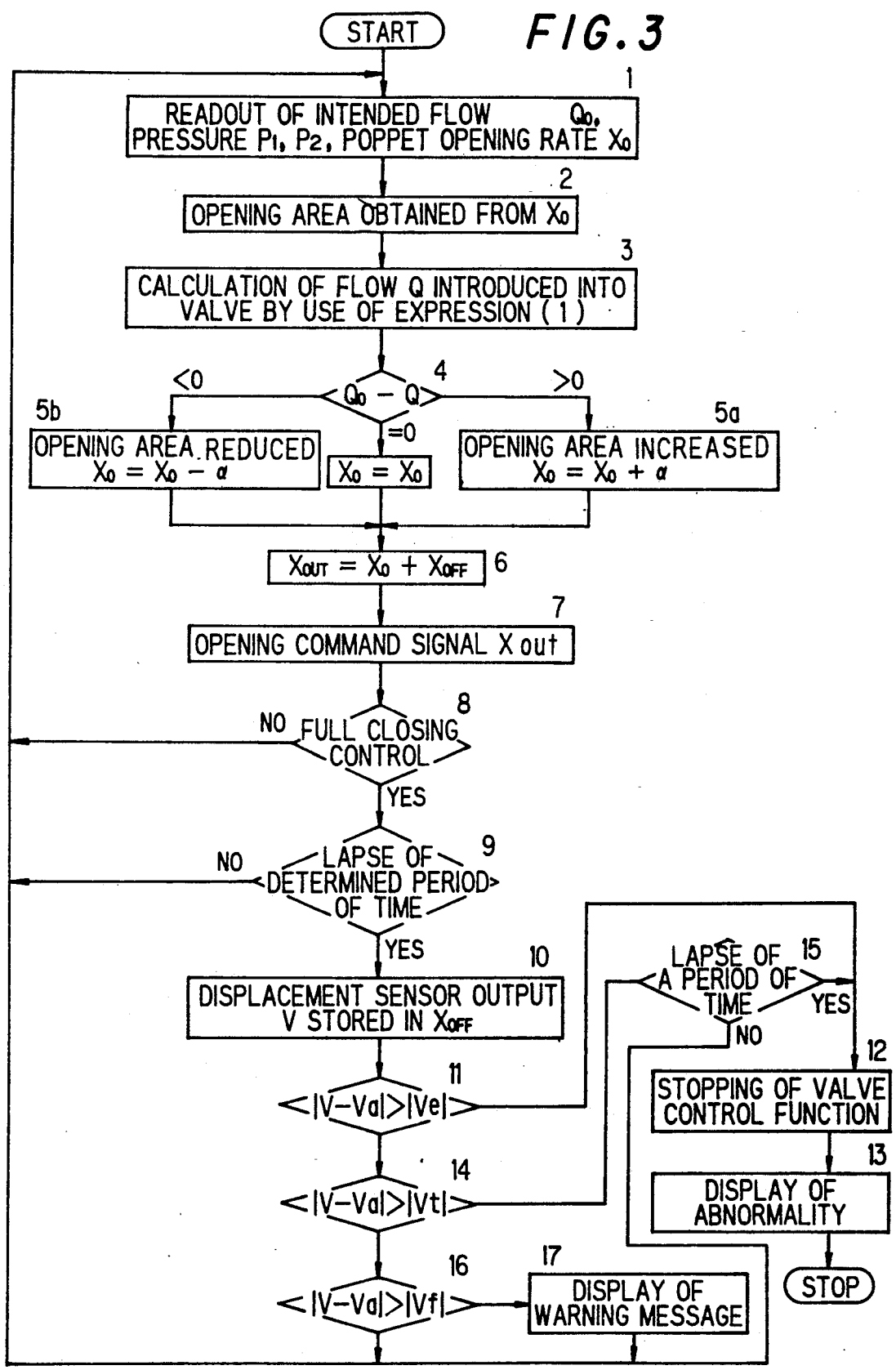

CONTROL DEVICE FOR A VALVE

BACKGROUND OF THE INVENTION

The present invention relates to a control device for use in a valve for controlling the flow of a fluid to obtain a desired flow, and in particular, for controlling the opening displacement of the valve.

Japanese laid-open patent publication Tokkaihei No. 2-72201 discloses an apparatus for controlling the valve opening displacement to correspond with an intended opening rate by detecting the actual opening displacement of the valve, the apparatus specifically being intended to bring under control the flow of a pressure fluid supplied to a hydraulic actuator for use with industrial and constructing machinery.

The flow controlled by a fluid control valve is dependent on the opening area of the valve (proportional to the opening displacement and the difference in pressure between the upstream and downstream. With the fluid control valve disclosed in said publication, when the intended flow is determined, the flow is calculated from the valve opening displacement and the upstream and downstream pressure, and the feed-back control of the valve opening is made so that the calculated flow may correspond to the intended flow.

However, in this case, any deflection arisen between the actual opening displacement and the opening rate detected by the sensor will cause an error between the calculated flow and the actually controlled flow.

If the valve and seat portion on which the valve is to be seated are subjected to gradual wear from good use for a long period of time, there may occur deviation between the actual opening displacement and the opening displacement detected by the sensor. In addition, if the temperature of a fluid around the sensor is unusually elevated, the sensor may fluctuate in its output property with the subsequent failure in corresponding to the amount of displacement.

In any of the cases, no correspondence is established between the controlled flow and the desired flow, thus resulting in no fair control permitted.

SUMMARY OF THE INVENTION

The object of the present invention is to decrease the error in detecting the valve opening displacement for increasing the accuracy of the control of the flow.

Another object of the present invention is to prevent any malfunction of controlled subjects to secure control safety by finding abnormality from a detected value of valve opening and to stop the control function when the abnormality is present.

In order to achieve these objects, in accordance with the present invention, there is provided a control device for a valve comprising; means for outputting a signal showing intended opening displacement of the valve, means for detecting displacement position corresponding to said valve opening rate, means for controlling said valve position so that the valve opening displacement may correspond with the intended opening displacement, means for judging whether or not the valve opening displacement corresponds to the full-closed position, means for updating and storing as a new signal showing valve full-closed position an output signal produced by said means for detecting displacement position when the valve is in said full-closed position, and means for correcting said signal showing the intended opening displacement with reference to this signal showing the full-closed position.

Futhermore, the present invention provides a control device for a valve comprising; means for outputting a signal showing intended opening displacement of the valve, means for detecting displacement position corresponding to said valve opening displacement, means for controlling said valve position so that said valve opening displacement may correspond with the intended opening displacement, means for judging whether or not said valve opening displacement corresponds to the full-closed position, means for updating and storing as a new signal showing the valve full-closed position an output signal produced by said means for detecting displacement position when the vavle is placed in said full-closed position, means for correcting the intended opening displacement for the valve with reference to this signal showing the full-closed position, means for judging that there exists a state of abnormality when the discrepancy between said newly updated and stored signal showing the valve full-closed position and the signal showing the initial valve full-closed position is found to be larger than a predetermined set value, and means for stopping the valve control function when the judgement is made to determine that there exists a state of abnormality.

BRIEF DESCRIPTION OF THE DRAWINGS

FIG. 3 is a flow chart showing a control operation executed by a controller.

DETAILED DESCRIPTION OF THE PREFERRED EMBODIMENT

Figure 1:
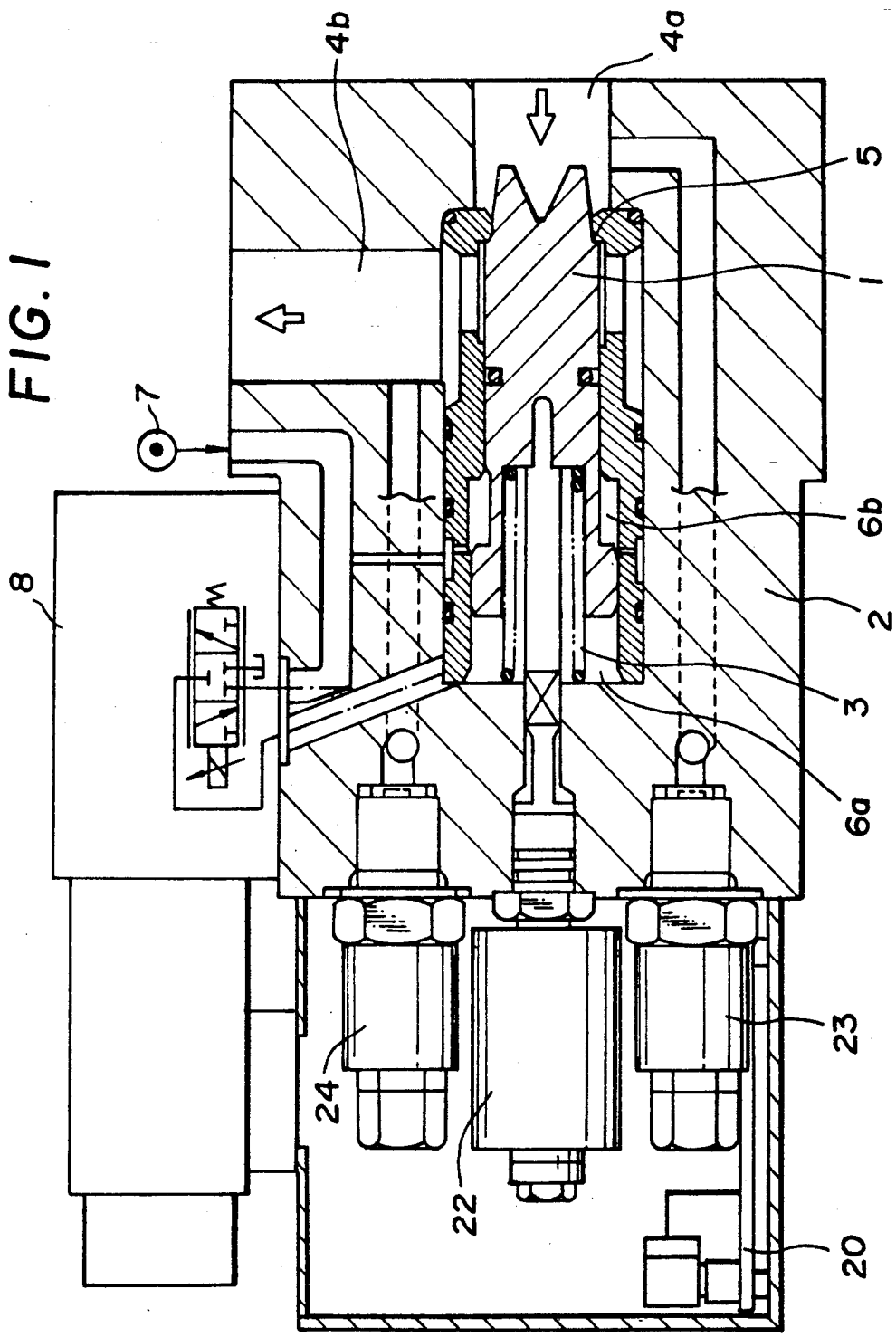
FIG. 1 is a cross sectional view of a fluid valve in accordance with the present invention.
Figure 2:
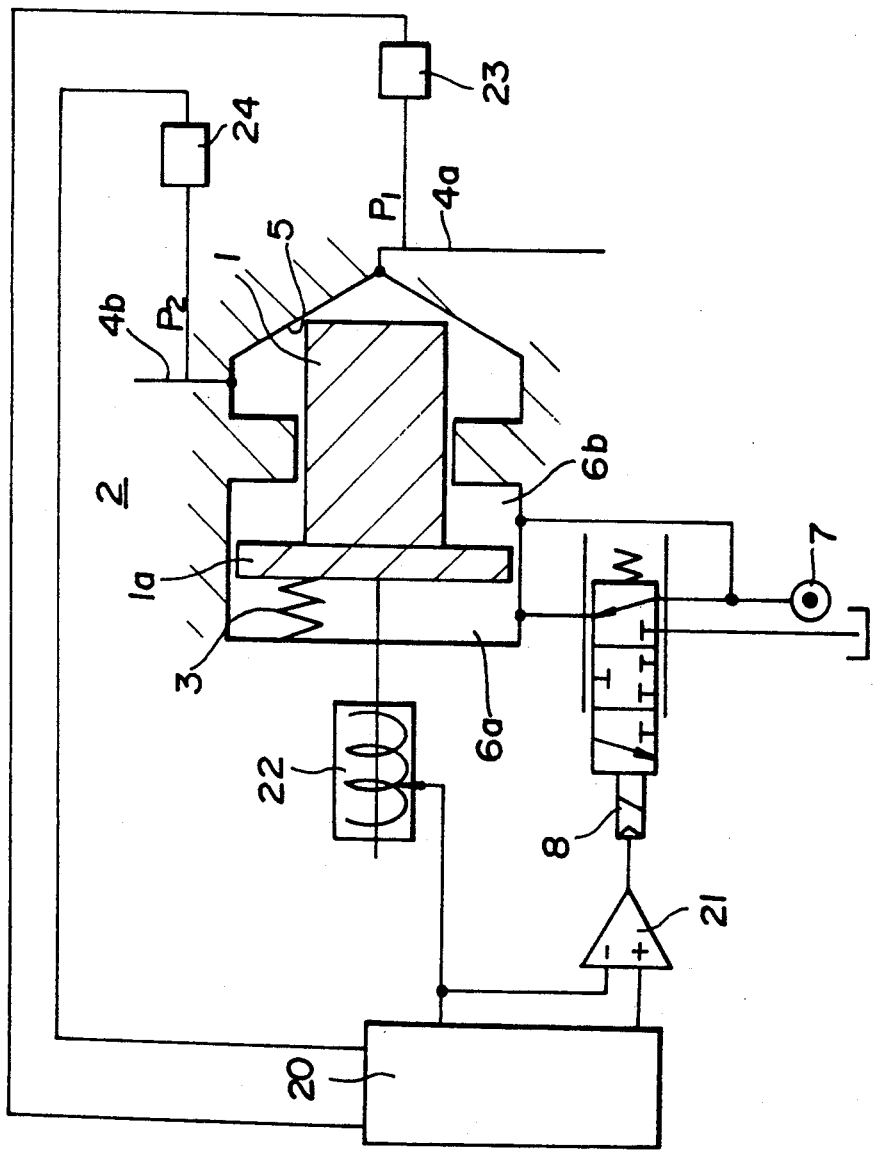
FIG. 2 is a hydraulic circuit diagram showing a control system.

Referring to FIGS. 1 and 2, the number 1 designates a poppet (valve) which may be slidably mounted in a valve housing 2. The poppet 1 is adapted to move to and away from a seat portion 5 so as to control a flow from a passageway 4a to the other 4b and vice versa.

Oil chambers 6a and 6b are formed at the opposite sides of a piston 1a of said poppet 1. The oil chamber 6a is provided with a return spring 3 by which the poppet 1 is biased to bring itself to a closed position. Said oil chamber 6a receives oil pressure through an electrohydraulic conversion valve 8, and the oil chamber 6b receives an oil pressure directly from a pump 7.

Accordingly, the poppet 1 is moved to a position relative to oil pressures of the oil chambers 6a, 6b which are balanced with the bias of he return spring 3. However, since the oil pressure in the oil chamber 6b remains constant and the return spring 3 has a fixed spring constant, the positioning control is dependent on the control pressure fed from the electro-hydraulic conversion valve 8 to the oil chamber 6a. However, the oil chamber 6a has a larger pressure area than that of the oil chamber 6b, so that the poppet 1 tends to move to the closed position in response to the supply of the same pressure.

There is provided a controller 20 for controlling the flow by the poppet 1 which is to be displaced.

The controller 20 transmits a signal to an amplifier 21 which acts to amplify the signal to drive the electro-hydraulic conversion valve 8, whereby the control of pressure being supplied to the oil chamber 6a may be achieved.

A displacement sensor 22 is provided for enabling determination the opening displacement of the poppet 1, i.e. by detecting the position to which the poppet 1 has moved in an axial direction, so that the sensor 22 serves to feed a detection signal to the controller 20. Additionally, there are provided pressure sensors 23 and 24 for sensing pressure inside each passageway 4a and 4b and also applying their respective signals to the controller 20.

When the controller 20, which is constituted by a microcomputer, receives an intended value Qo of a desired control flow, it computes, in the following manner, the opening displacement of the poppet 1 in order that the valve may be driven to allow a passage of the desired flow.

The flow Q regulated by the flow control valve can be found by the following expression.

$$Q = K \cdot Ax \sqrt{|P_1 - P_2|} \qquad (1)$$

wherein Ax is the area of opening of the poppet 1, $P_1$ and $P_2$ are the pressure in the up and down streams of the poppet 1, and K is the flow constant.

The opening area Ax of the poppet 1 can be obtained in the following equation.

$$Ax = f \cdot Xo \qquad (2)$$

wherein Xo is the opening displacement of the poppet 1.

Thus, the opening command signal for the poppet 1 is increased so that the opening area Ax of the valve is increased when the actual flow Q obtained by the expression (1) is smaller than the intended flow Qo, while the opening command signal for the poppet 1 is reduced so that Ax is decreased when Q is larger than Qo.

The opening command signal for the poppet 1 thus calculated by the controller 20 is outputted to said electrohydraulic conversion valve 8, and poppet 1 is regulated for its opening accordingly.

However, if a deviation occurs in that the value detected by the displacement sensor 22 does not correspond to the actual opening displacement of the poppet 1, the flow under control varies from the desired flow. In order to avoid such a flow variation, the controller 20 functions to correct a signal showing the opening displacement in response to the output produced by the displacement sensor 22 when the poppet 1 has been closed.

The accurate correspondence between the actual opening displacement and the detected opening displacement can be obtained by updating the value detected by the displacement sensor 22 as a new zero (fully closed) position in a position wherein the opening command signal is a zero position signal, and producing an opening command signal as a signal resulting from the addition of this zero position signal to the poppet opening signal. If the full-closed position signal changes to exceed the determined value much more than the initial full-closed position signal, the decision is made that something abnormal has happened with the result that the control function may be stopped in some cases.

These control operations for the controller 20 will be described in detail with reference to the flow chart as shown in FIG. 3.

At steps 1-3, the actual flow Q of the valve is calculated by the use of the expression (1) based on the input data of the intended flow Qo of the command control flow, pressure $P_1$, $P_2$ of the passageways 4a, 4b and the opening displacement X of the poppet 1. At step 4, 1 comparison is made between the intended flow Qo and the control flow Q, and if Qo>Q, poppet opening Xo=Xo+α is set so as to increase the poppet opening area Ax, and if Qo<Q, the poppet opening Xo=Xo−α is set so that the opening of poppet 1 is descreased (wherein α>0).

If Qo=Q, Xo=xo, and the value of the poppet opening is maintained (step 5a-5c).

A full-closed position signal Xoff with reference to the output produced from the displacement sensor 22 at the time when the poppet 1 is fully closed is added to this control opening rate Xo (steps 6, 7).

In this way, the opening displacement of the poppet is controlled to the correct intended value to control to the flow in response to the resultant opening displacement.

Next, in order to compensate the opening displacement signal when the poppet 1 is fully closed, the judgement is made as to whether or not the opening displacement command signal Xout indicates that the poppet 1 is in the full-closed position at the step 8. For example, judgement with the valve being fully closed is made when the input Xout is lower than the value of Xoff. If the result of the judgement is YES, in the lapse of a predetermined period of time after such a judgement is made, a position signal as a new full closed position signal Xout, produced by the displacement sensor 22 in updated, is stored in a memory (Steps 9 and 10).

Thus, if the position in which the valve is closed has varied with wears in the poppet 1 or seat portion 5, an opening displacementg of the poppet 1 may be determined with reference to a position in which the poppet 1 has actually been closed, the valve opening displacement of high accuracy may be obtained, and a highly accurate flow control may be achieved at all times. Since said operation of updating and storing the full-closed position signal takes place after the lapse of the predetermined period of time, values being stored as full-closed position signals may remain stabilized with a higher reliability.

In order to judge an existence of an abnormality in the fully to closed position from the output of the displacement sensor 22 at the full-closed position, a difference between the output V generated by the displacement sensor 22 when the poppet 1 is fully closed and the output Va at the initial full-closed position is obtained, and then the resultant difference |V−Va| is compared with a first set value ΔVe corresponding to a predetermined abnormality which is uncontrollable.

If such the difference has been found to be larger than the set value, judgement is made as to whether the displacement sensor 22 is in abnormal condition or the poppet 1 cannot rest on the seat portion 5 due to mechanical failure, and as a result, the control operation is stopped at steps 12, 13, followed by a display of such an abnormality.

If said difference |V−Va| is smaller than the first set value ΔVe, it is compared with a second set value Vt which is smaller than the first set value |αVe| and corresponding to a sensor output at an abnormal temperature at step 14. In the case of said difference is larger than the second set value |ΔVt|, and such a state lasts for more than a period of time (step 15), judgement is made that the sensor property has been changed by an abnormal elevation of temperature in the vicinity of the displacement sensor 22, and the steps 12, 13 are taken place, wherein the control operation is also stopped as in said case.

Furthermore, if said $|V-Va|$ is smaller than the second set value $|\Delta Vt|$, the former is compared with a third set value $|\Delta Vf|$ which is smaller than the second set value $|\Delta Vt|$ at step 16. This third set value $|\Delta Vf|$ corresponds with the poppet 1 and set portion 5 which are worn enough to be far from the optimum condition, and if the difference is larger than the third set value, a warning message of wear is deivered (step 17). In this case, the flow control function can be maintained, and so the control is continued.

As described above, judgement is made by the output produced by the displacement sensor 22 when the poppet 1 is fully closed as to whether or not abnormality exists in the control operation, and the control function is stopped in case of the operational abnormality, thereby to ensure a safe operation of the controlled objects.

In the present invention, various other modifications may be made without departing from its spirit and essential characteristic features, and the preferred embodiments are shown by way of example and by no means limited thereto.

What is claimed is:

1. A control device for a valve comprising;
    means for storing a signal corresponding to the displacement of the valve at a full-closed position thereof;
    means for outputting a signal corresponding to an intended opening displacement of the valve,
    means for detecting displacement position corresponding to said opening displacement of the valve,
    means for controlling by feedback said valve position so that the valve opening displacement may correspond with the intended opening displacement,
    means for determining whether or not the valve opening displacement corresponds with the full-closed position,
    means responsive to a determination by said determining means for replacing the signal stored in said storing means with the output signal produced by said means for detecting displacement when said valve is in said full-closed position,
    and means for correcting said signal showing the intended opening displacement of the valve with reference to the signal stored in the storing means.

2. A control device for a valve as defined in claim 1, wherein said replacing means also replaces said signal stored in said storing means with the output signal from said means for detecting displacement position in the event of a lapse of a predetermined period of time after the signal corresponding to the valve full-closed position has been generated.

3. A control device for a valve comprising;
    means for outputting a signal showing intended opening displacement of the valve,
    means for storing a signal corresponding to the displacement of the valve at a full-closed position thereof;
    means for detecting the displacement position corresponding to said valve opening displacement,
    means for controlling by feedback said valve position so that said valve opening displacement corresponds to the intended opening displacement,
    means for determining whether or not said valve opening displacement corresponds to the full-closed position,
    means responsive to said means for determining for replacing the signal stored in said storing means with the output signal produced by said means for detecting displacement when the valve is fully closed,
    means for correcting a signal corresponding to the intended valve opening displacement with reference to the signal stored in said storing means,
    means for determining that there exists a state of abnormality when a discrepancy between the last signal in said storing means and an initial signal stored therein corresponding to an initial valve full-closed position is found to be larger than a predetermined set value,
    and means for stopping the valve control function when a determination is made that there exists a state of abnormality.

4. A valve control device having means for outputting a signal for an intended valve opening, means for detecting a valve position which corresponds to the valve opening, and means for controlling the valve position to correspond to the intended valve opening by feedback control, comprising
    storing means for storing a signal corresponding to the displacement of said valve when said valve is in a full-closed position,
    means responsive to the means for detecting a valve position for determining whether the valve is in a full-closed position,
    means for replacing the signal in said storing means with the output of said means for detecting a valve position, when the valve position is at the full-closed position, and
    means for correcting a signal corresponding to the intended valve opening as a function of the signal stored in said storing means and corresponding to the output of said means for detecting.

5. A valve control device as defined in claim 4, wherein the means for replacing a signal stored in said storing means comprises means for storing the signal produced by the means for detecting the valve position in said storing means in the event of a lapse of a predetermined period of time after the signal corresponding to a full-closed position is generated.

6. A valve control device having means for outputting a signal for an intended valve opening, means for detecting a valve position which corresponds to the valve opening, means for controlling the valve position to correspond to the intended valve opening by feedback control, comprising
    storing means for storing a signal corresponding to the displacement of said valve when said valve is in a full-closed position,
    means responsive to said means for detecting a valve position for determining the occurrence of a valve position corresponding to a full-closed position thereof,
    means for replacing the signal stored in said storing means with the output of said means for detecting a valve position when the valve is in the full-closed position,
    means for correcting the signal corresponding to an intended valve opening signal as a function of the signal stored in said storing means by said replacing means,
    means for determining that a state of disorder has occurred when the signal stored in said storing means, to replace a signal previously stored therein, is larger than an initial value stored therein, and
    means for stopping the valve control function when a determination has been made that a state of disorder has occurred.

* * * * *